(12) United States Patent
Spaggiari

(10) Patent No.: US 6,570,291 B1
(45) Date of Patent: May 27, 2003

(54) METHOD AND DEVICE FOR BALANCING ROTORS, IN PARTICULAR FOR ELECTRIC MOTORS

(75) Inventor: Alessandro Spaggiari, Correggio (IT)

(73) Assignee: Spal's S.R.L., Corregio (IT)

(*) Notice: Subject to any disclaimer, the term of this patent is extended or adjusted under 35 U.S.C. 154(b) by 0 days.

(21) Appl. No.: 09/743,706
(22) PCT Filed: May 19, 1999
(86) PCT No.: PCT/IT99/00141
§ 371 (c)(1),
(2), (4) Date: Mar. 15, 2001
(87) PCT Pub. No.: WO00/04624
PCT Pub. Date: Jan. 27, 2000

(30) Foreign Application Priority Data

Jul. 15, 1998 (IT) ..................................... RE98A000072

(51) Int. Cl.⁷ ................................................. H02K 3/48
(52) U.S. Cl. ...................................... 310/214; 74/573 R
(58) Field of Search ................................ 310/214, 179, 310/51, 261, 264, 265; 74/573 R; 29/598, 596

(56) References Cited

U.S. PATENT DOCUMENTS 2,316,635 A    4/1943  Staak .......................... 310/214
2,921,208 A  * 1/1960  Morrill ........................ 310/214
5,821,649 A  * 10/1998 Langhorst ................... 310/68 R

FOREIGN PATENT DOCUMENTS

DE       823 760      12/1951
DE     1 613 201       5/1970
DE     1 613 848       5/1971
DE       24 36 435     2/1976

OTHER PUBLICATIONS

A. L. Jokl, Theory and Design of Synchronous Machines, Spring 1993, p. 2.*

* cited by examiner

Primary Examiner—Nestor Ramirez
Assistant Examiner—Dang Dinh Le
(74) Attorney, Agent, or Firm—Browdy and Neimark, P.L.L.C.

(57) ABSTRACT

Method and device (4) for balancing rotors (1), in particular for electric motors, by the addition of material, in which the actual balancing step is carried out by inserting, inside one or more recesses (2) formed in the rotor (1) and designed to seat the rotor winding (3), one or more self-locking balancing devices (4) made of non-ferromagnetic material and having a mass which can be determined beforehand in terms of both its amount and its distribution.

8 Claims, 2 Drawing Sheets

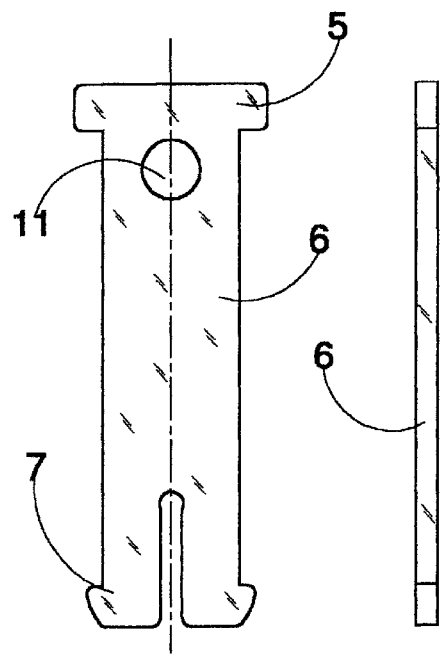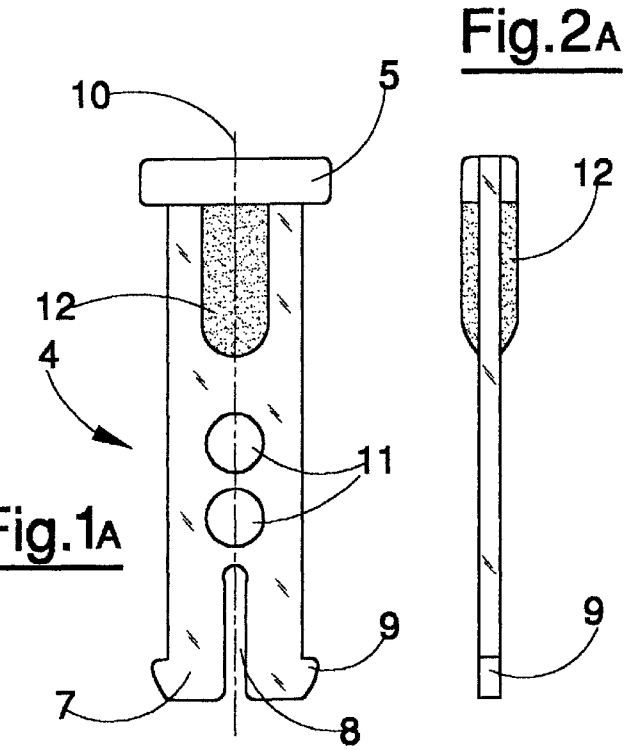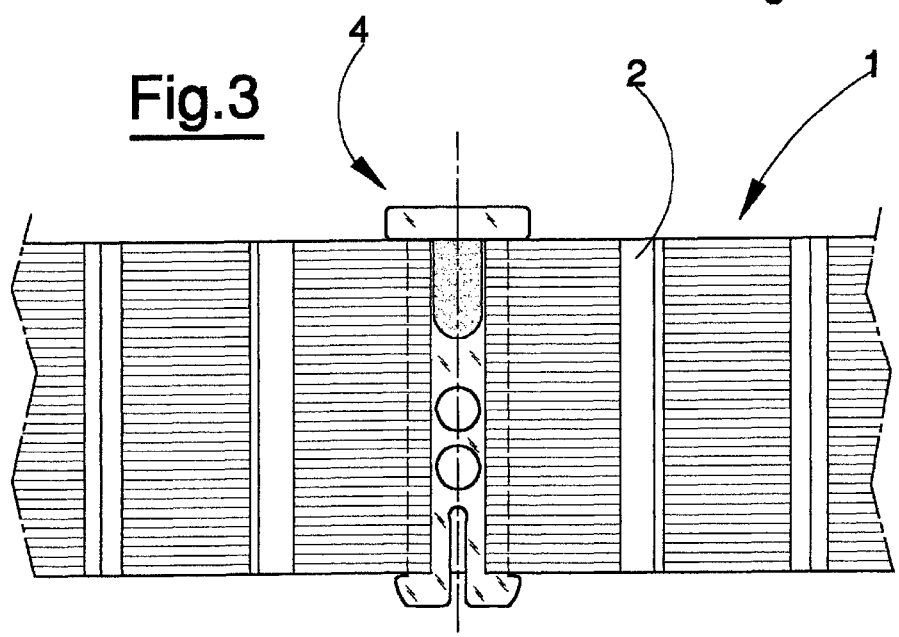

METHOD AND DEVICE FOR BALANCING ROTORS, IN PARTICULAR FOR ELECTRIC MOTORS

The present application is the national stage under 35 U.S.C. 371 of PCT/IT99/00141, filed May 19, 1999.

TECHNICAL FIELD

The present invention relates to a method and a device for balancing rotors, in particular for electric motors. This method and associated device fall within the application sector relating to the balancing of rotors of small and medium-sized electric motors with rotors having teeth alternating with recesses arranged in the longitudinal direction.

Both the static and dynamic type of method for balancing a rotor essentially consist of two steps: measurement of the imbalance and elimination of this imbalance or actual balancing.

During the first step, the imbalance of the rotor is measured with a suitable known apparatus which provides the operator with the value of the mass which it is necessary to add or remove and the position on the rotor where this addition or removal must be performed.

During the second step, the operator performs the addition or the removal of material necessary for balancing the rotor itself.

BACKGROUND ART

With regard to this second overall balancing process step, methods for removing material are known, said methods consisting in milling or boring the external metal laminations forming the rotor.

In the field of the balancing methods which involve the specific addition of material, methods are known, involving the application of a certain quantity of single or dual-component adhesive paste able to harden either by means of drying in air or by means of exposure to ultraviolet rays.

The use of balancing paste has various drawbacks: firstly, because it is a substance which is generally harmful to a person's health and, as such, suitable caution and protective means must be used by the operator in order to avoid the consequences arising from contact or prolonged exposure to the substance itself. Secondly, the necessity for hardening and hence stabilization of the paste results in the use of special equipment or methods, relatively long times and consequently high costs.

In particular, in the case of a single-component paste, the use of a specific apparatus designed to stabilize the paste by means of exposure to ultraviolet rays is necessary, with obvious additional costs for the purchase and the use of said apparatus in addition to the amount of time lost waiting for complete stabilization of the paste itself.

Also as regards the dual-component paste, the times are increased since, for the purposes of stabilization, it is necessary first to mix the two components and then wait for stabilization by means of air drying.

In addition to these drawbacks, however, there is also both the uncertainty with regard to application of the exact quantity required and positioning; moreover, there is always the risk of the paste becoming detached during the working life of the rotor.

A further method for balancing rotors by means of the addition of material, in particular for electric motors, is known, said method envisaging the engagement of a U-shaped metal plate to one of the rotor teeth.

This method, although being quick and inexpensive, nevertheless has some drawbacks: firstly, the plate must be forced into its position and this involves a specific operation and the use of a suitable tool; secondly, the plate consists of a ferromagnetic material which is placed within the electromagnetic field of the rotor, thereby constituting an—albeit limited—local discontinuity in the field which risks negatively influencing the performance of the motor itself. The object of the present invention is that of eliminating the abovementioned drawbacks and providing a method and a device for balancing rotors, in particular for electric motors, by means of the addition of material, which may be applied in a rapid, precise, clean, low-cost and versatile manner, without interfering with operation of the motor, namely without affecting the electromagnetic field of the motor itself.

Said objects are fully achieved by the method and device for balancing rotors, in particular for electric motors, according to the present invention, which is characterized by the contents of the claims indicated below.

DISCLOSURE OF THE INVENTION

In particular the method for balancing rotors in question, by means of the addition of material, is characterized by the fact that the actual balancing step consists of the insertion of one or more self-locking balancing devices, made of non-ferromagnetic material, inside one or more recesses formed in the rotor and designed to seat the rotor winding, these devices being of the type having a mass which is known and can be determined beforehand in terms of both its amount and its distribution.

In particular, the abovementioned method is characterized by the fact of being able to perform both static and dynamic type balancing, by suitably choosing between a flat-type and bulb-shaped device.

In addition to the method, the present invention also relates to device for balancing rotors which is characterized in that it may be formed so as to be inserted and self-locking inside a recess formed in the rotor and designed to seat the rotor winding.

In fact, although being able to vary in shape, size and proportions, the device for balancing rotors is characterized by the fact it is made of non-ferromagnetic material and consists of a head, a body extending longitudinally with respect to the axis and a resilient end, for allowing insertion into the recess and locking thereof by small tooth means.

BRIEF DESCRIPTION OF THE DRAWINGS

These and other characteristic features will emerge more clearly from the following description of a preferred embodiment illustrated, purely by way of a non-limiting example, in the accompanying plates of drawings, in which:

FIG. 1 shows a front view of a device for balancing rotors, in particular for compensating for static imbalances;

FIG. 2 shows a side view of the abovementioned device;

FIG. 1A shows a front view of a device for balancing rotors, in particular for compensating for dynamic imbalances;

FIG. 2A shows a side view of the abovementioned device;

FIG. 3 shows a linearly developed view of a rotor with a device inserted in a recess;

DETAILED DESCRIPTION OF THE PREFERRED EMBODIMENTS

Figure 5:
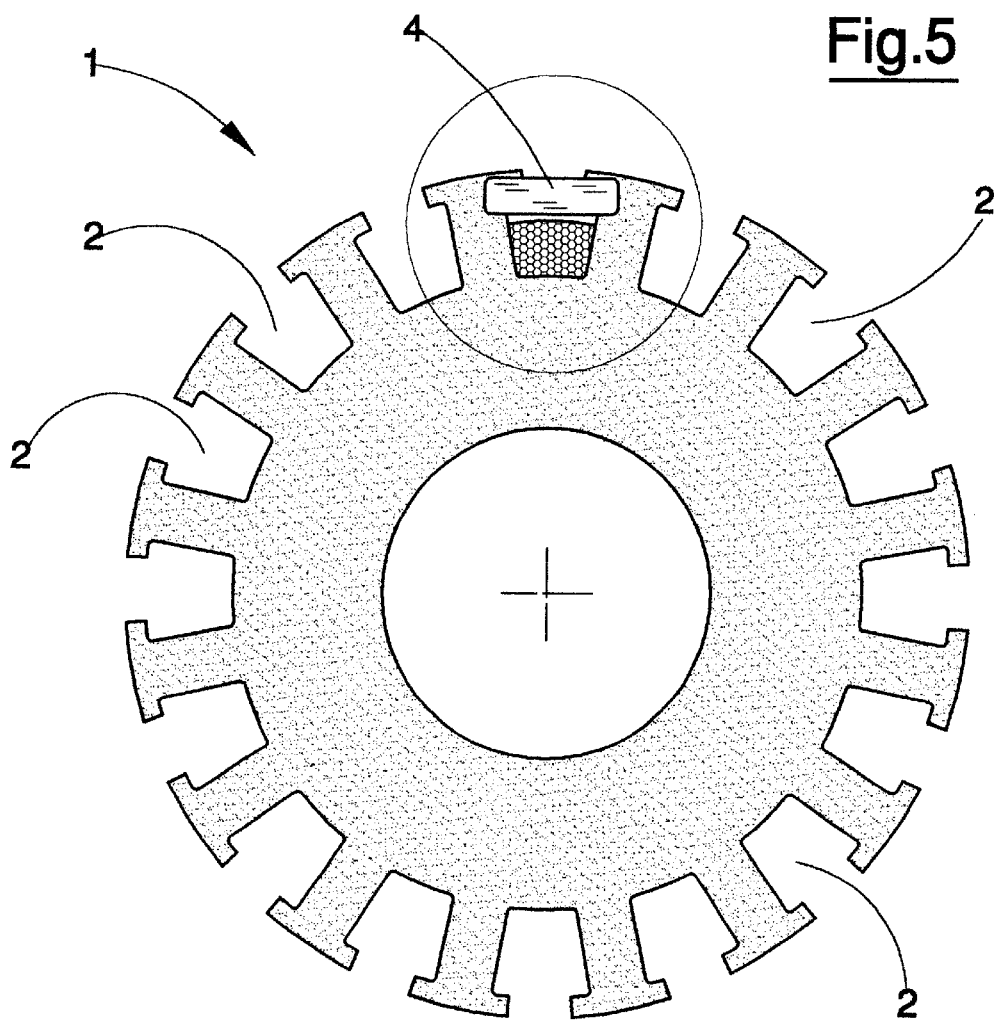
FIG. 5 shows a rotor, viewed frontally, with a device inserted and locked in a recess.

With reference to the figures, 1 denotes a rotor to be balanced, in which it is possible to see the recesses 2 housing a rotor winding 3 and for accommodating a balancing device 4.

The method for balancing rotors 1 by means of the addition of material according to the present invention envisages, after a first known step of determining the value of the mass required and its position with respect to the rotor itself, a second actual balancing step during which one or more devices 4 are inserted into one or more recesses 2. This insertion is performed manually or mechanically without the aid of forcing instruments or tools, parallel to the longitudinal axis of the rotor 1 and the device 4.

The device 4 is positioned between the rotor winding 3 and the external extension of the teeth which stop the movement of the device 4 itself in the radial direction. Complete locking of the device 4 inside the recess 4 is obtained owing to its original configuration which prevents axial sliding thereof with respect to the recess 2; for this reason the balancing device 4 is substantially self-locking.

Insertion of the device 4 is simple since it is not required to modify at all the configuration of the pole shoes, or rotor teeth, or the configuration of the winding itself.

With reference to the figures, 4 denotes the balancing device in its entirety, which comprises an end or head 5, a body 6 extending substantially longitudinally with respect to the axis 10 and a resilient end 7 opposite to the head.

The head end 5, when the device 4 is locked inside the recess 2, rests against the outside of the rotor recess and is made with different configurations according to the desired mass, and comprises at least one abutting tooth which is wider than the profile of the body 6. The resilient end 7 is substantially fork-shaped and consists of a portion of the body 6 which has an opening 8 formed in it and extending substantially longitudinally with respect to the axis 10 of the body itself, so as to allow insertion into the recess 2 and locking therein of the device 4 by means of small abutting teeth 9 formed in the resilient end 7 on opposite sides with respect to the longitudinal axis 10.

The body 6 of the balancing device 4 extends mainly in the longitudinal direction and has a length substantially the same as the length of the rotor 1 and hence its recesses 2.

The device 4 for balancing rotors 1 may be made with different shapes, lengths and masses, with a centre of gravity positioned at different distances from the middle of the body of the device 4, so as to compensate for the imbalance of the rotor 1. In particular, once the length of the device 4 has been fixed according to the rotor assembly, it is possible to obtain variations in the position of the centre of gravity of the device 4 by varying the dimensions of the head 5 depending on the mass to be applied, or by forming in the body 6 a plurality of weight-reducing holes 11 or by providing the head 5 with bulb-shaped weights 12.

The method for balancing rotors, in particular for electric motors, may envisage balancing of the static type, and balancing of the dynamic type, a distinction which defines at least two types of devices 4; a flat type (FIGS. 1, 2) and a bulb type (FIGS. 1A, 2A).

The flat type, as shown in FIGS. 1 and 2, comprises a device 4 formed so as to produce only a local increase in the mass of the rotor in its plane of rotation. In this particular embodiment, the basic elements forming the device 4 can be seen: the head 5, the body 6 and the resilient end 7 formed at the end of the body 6 by means of an opening 8 and provided with small abutting teeth 9 necessary for preventing axial sliding of the device 4 inside the recess 2. Again with reference to FIG. 1, it is possible to see the weight-reducing holes (or hole) 11 formed in the body 6 so as to displace the centre of gravity thereof with respect to the middle.

The bulb-type device, shown in FIGS. 1A and 2A, concentrates material in the zone of the head 5 so as to produce both a local increase in the mass of the rotor in its horizontal plane and a rotary torque perpendicular to the plane of rotation of the rotor.

Figure 4:
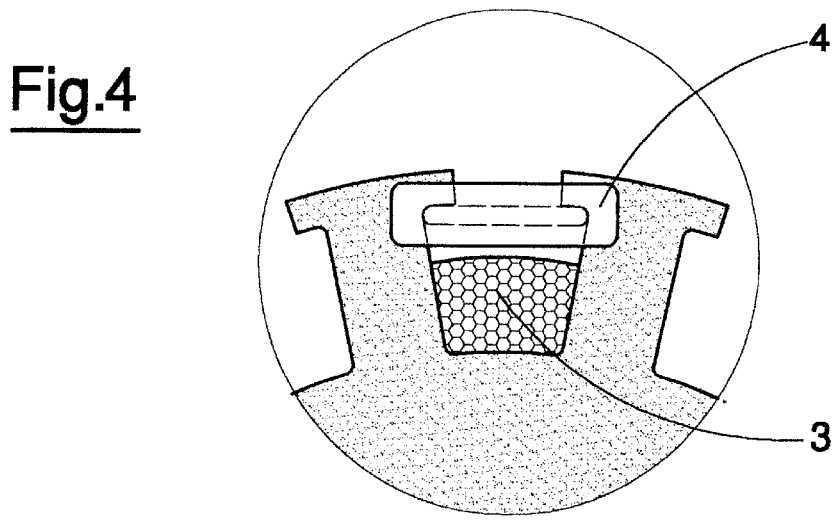
FIG. 4 shows a detail, viewed frontally, of a rotor with a device inserted in a recess.

FIGS. 3, 4 and 5 show the position of the device 4 with respect to the recess 2; in particular FIGS. 4 and 5 show locking, in the radial direction, of the device 4 arranged between the rotor winding 3 and the shoe at the end of the teeth.

In view of its shape, the device 4 for balancing rotors may be made of thermoplastic material and hence non-ferromagnetic material and, as such, is unable to influence the performance of the motor.

The use of a self-locking device reduces considerably the balancing times, does not require either special forcing tools or balancing pastes, thus being more immediate, cleaner, more cost-effective, safer and more precise compared to conventional methods.

In fact, each device 5 has its own exact weight which may be known and determined much more precisely than a pellet of adhesive paste as used hitherto.

Moreover, the possibility of using thermoplastic material, in addition to not affecting the electromagnetic field of the motor, makes it possible to make use of the well-established technology of thermoplastic injection-moulding which is inexpensive and able to produce easily variations in the basic device described, making the method very versatile.

In the description, specific reference has been made to the application involving an electric motor, but it is obvious that both the method and the device may be applied to other electric machines with a rotor, such as for example generators.

What is claimed is:

1. A device (4) for balancing a rotor (1), in particular for an electric motor, the rotor having an axial dimension and being provided with a plurality of recesses extending along the axial dimension for seating a rotor winding, the device (4) being used during the step of the rotor balancing method consisting in the actual balancing step involving adding of material, the device (4) being made of a non-ferromagnetic material and comprising:

a body (6) having an axis (10) and;

a head (5), connected to the body (6), having an enlarged section in respect to the body (6);

a resilient end (7) connected to the body (6), the resilient end (7) being formed substantially in the manner of a fork, consisting of a portion of the body (6) the resilient end having an opening (8) extending substantially longitudinally with respect to the axis (10) of the body and small teeth (9) on opposite sides of the longitudinal axis (10), the opening and the small teeth allowing insertion of the device (4) into one of the recesses (2) and locking therein, wherein the device (4) has a length that is greater than the axial dimension of the rotor and is insertable and self-lockable inside one of the recesses (2) in the rotor (1) to extend over the axial dimension of the rotor, and the actual balancing of the rotor (1) consists in inserting one or more of the balancing devices (4) inside the recesses (2) formed in the rotor (1).

2. The device (4) for balancing rotors (1) in electric motors according to claim 1, characterized in that the body (6) is provided with a plurality of weight-reducing holes (11).

3. The device (4) for balancing rotors (1), in particular for electric motors, according to claim 1, characterized in that the device (4) is formed so as to be flat, that is so as to produce only a local increase in the mass of the rotor in its plane of rotation.

4. The device (4) for balancing rotors (1), in particular for electric motors, according to claim 1, characterized in that the device (4) is formed so as to be bulb-shaped, concentrating material in the zone of the head (5), so as to produce both a local increase in the mass of the rotor, in its plane of rotation, and a rotary torque perpendicular to the plane of rotation of the rotor.

5. The device (4) for balancing rotors (1), in particular for electric motors, according to claim 1, characterized in that the device (4) consists of non-ferromagnetic material.

6. The device (4) for balancing rotors (1), in particular for electric motors, according to claim 1, characterized in that the head (5) consists of at least one abutting tooth which is wider than the profile of the body (6).

7. An electric motor comprising a rotor (1) having teeth alternating with recesses (2), characterized in that the balancing device (4) according to claim 1 is seated in one of the recesses (2) of the rotor (1).

8. A method for balancing a rotor (1) having an axial dimension, in particular for an electric motor, comprising the compensating for a lack of equilibrium or imbalance of the rotor by addition of material, wherein the method comprises:

inserting, inside one of the recesses (2) formed in the rotor (1), extending along the axial dimension of the rotor and designed to seat the rotor winding (3), a self-locking balancing device (4) made of non-ferromagnetic material, the locking balancing device (4) comprising a head (5), a body (6) having an axis (10), and a resilient end (7) which is formed substantially in the manner of a fork and consists of a portion of the body (6), the resilient end having an opening (8) extending substantially longitudinally with respect to the axis (10) of the body so as to allow insertion of the device (4) into the recess (2), wherein the device (4) has a length that is greater than the axial dimension of the rotor and is inserted to extend over the axial dimension of the rotor, and locking the device (4) in the one of the recesses by means of small teeth (9) formed in the resilient end (7) on opposite sides of the longitudinal axis (10).

* * * * *

UNITED STATES PATENT AND TRADEMARK OFFICE
CERTIFICATE OF CORRECTION

PATENT NO. : 6,570,291 B1
DATED : May 27, 2003
INVENTOR(S) : Spaggiari

It is certified that error appears in the above-identified patent and that said Letters Patent is hereby corrected as shown below:

<u>Title page,</u>
Item [73], delete "Spal's" and insert therefor -- SPAL --.

Signed and Sealed this

Twenty-second Day of July, 2003

JAMES E. ROGAN
*Director of the United States Patent and Trademark Office*